Figure 1:
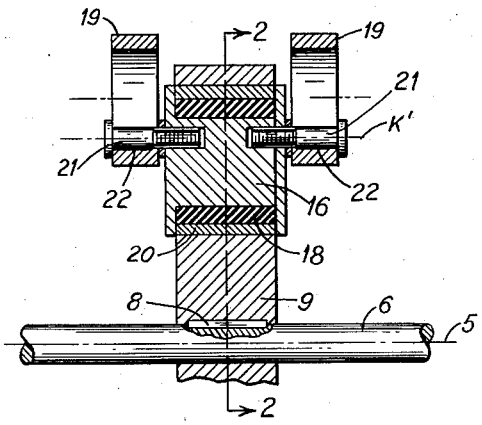

Sept. 14, 1948.    F. M. M. B. SALOMON    2,449,087
OSCILLATION REDUCING DEVICE
Original Filed Aug. 16, 1939

INVENTOR.
Francois M. M. B. Salomon
BY
F. Bascom Smith
ATTORNEY

Patented Sept. 14, 1948

2,449,087

UNITED STATES PATENT OFFICE 2,449,087

OSCILLATION REDUCING DEVICE

Francois Marie Michel Bernard Salomon,
Paris, France

Original application August 16, 1939, Serial No. 290,433. Divided and this application May 25, 1945, Serial No. 595,837. In Luxembourg August 17, 1938

14 Claims. (Cl. 74—574)

This invention relates to apparatus for reducing oscillations or vibrations in machine parts, or the like, and more particularly to vibration reducing means adapted for operation in conjunction with a rotating shaft or the like.

This application is a division of my copending application Serial No. 290,433, filed August 16, 1939, for "Oscillation reducing device," now Patent No. 2,383,516, and all subject matter in said prior filed application which is applicable to the disclosure of the present application is incorporated herein by reference.

For reducing the vibrations of machine shafts, others have heretofore used devices which employ movable auxiliary masses that may be of the most varied shapes, such as flywheels or plates which are centered or not centered on the shaft, centrifugal masses that are independent or centered on the shaft or the like, the movements of said masses being furthermore damped by various means. This damping may be obtained, for example, by the friction of solid surfaces on solid surfaces, by using fluids or even by other means such as electrical means. On the other hand, springs or various resilient substances that may even be fluid may furthermore be used either for providing elastic couplings on the shafts or for producing retracting moments on the auxiliary oscillating masses. Systems of the above character will be hereinafter referred to as "systems of the first type."

A second type of device has also been used for reducing speed oscillations and vibrations, said devices being particularly applicable to machine shafts and being characterized by the use of auxiliary masses which are completely free on their guideways, involve very slight friction, and are subjected solely to the action of the distributing forces and to the retracting action of the centrifugal forces. The natural periods of oscillation of a centrifugal mass in a device of the second type is preferably tuned to the periodic disturbing forces to be compensated and may in particular be equal to it.

The present invention has for one of its objects the provision of combinations of the systems of the two types mentioned above, it being understood, of course, that the novel system comprehended does not involve a simple juxtaposition of said types but a real combination thereof as will be seen hereinafter.

The technical advantage of this combination is a question of species and it may happen that the systems of the second type with as little friction as possible on the auxiliary masses are preferable to the "combined" systems. In certain cases, however, the systems of the second type with free masses may per se possess properties which vary too quickly with their constructional peculiarities so that very small differences in such peculiarities which may, for example, be due to possible errors in machining completely modify the properties of the oscillation reducer. In such cases, it is advantageous to use the devices which are the object of the present invention wherein the action of the devices of the first type (involving frictional damping devices and optionally the use of springs or resilient substances) enables the acuteness of the characteristic curves of the complete system to be reduced. Under these conditions given differences in the constructional features may be of less importance. In particular, a greater variation in the natural period of a centrifugal pendulum of the second type may become acceptable without substantially altering the properties of the whole arrangement.

It must be carefully noted that the fact that the above combination may be advantageous in certain cases does not in any way change the technical importance of the systems of the second type having free centrifugal masses. Although said systems of the second type may in some instances be very advantageous in combination with systems of the first type, it may be more advantageous in other instances to use one of said systems alone.

Figure 2:
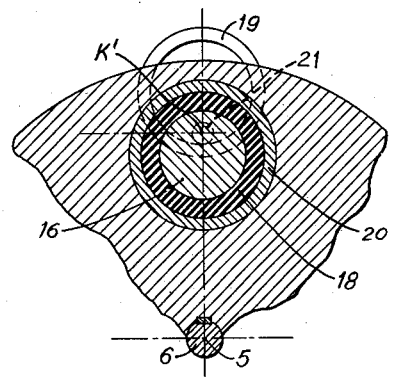
Figure 3:
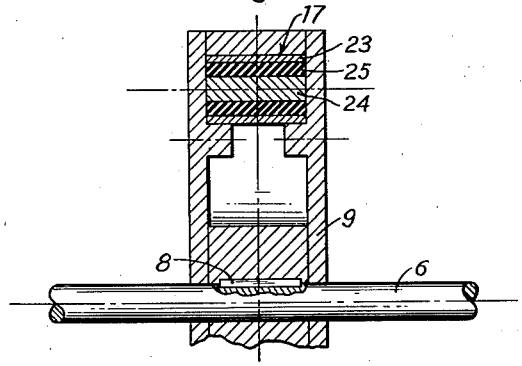
Figure 4:
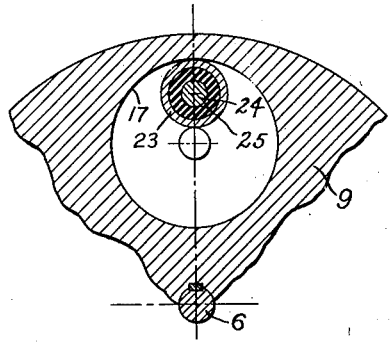

Other advantages and peculiarities of the invention will become apparent from the ensuing description when the same is taken in conjunction with the accompanying drawings which diagrammatically show, merely by way of example, two embodiments of the invention. In the drawings, wherein like reference characters refer to like parts throughout the several views, Fig. 1 is a diagrammatic side elevation, partly in section and with parts broken away, showing one embodiment of a device embodying the present invention and fitted on a crankshaft of an engine, such as a straight four-cylinder heat engine;

Fig. 2 is a detail sectional view of the device illustrated in Fig. 1, the section being taken substantially on line 2—2 of Fig. 1; and, Figs. 3 and 4 are views similar to Figs. 1 and 2, respectively, showing a second embodiment of the invention.

Referring first to Figs. 1 and 2, 5 is the axis of a rotatable shaft 6 which may be mounted in any suitable known manner and driven by a suitable source of power (not shown). Shaft 6 may, for example, be the crankshaft of an internal combustion engine. Secured to shaft 6 for rotation therewith is a plate 9. Any suitable means such as a key 8 may be employed for connecting shaft 6 and plate 9.

It has been shown, particularly in Salomon U. S. Patents Nos. 2,029,796, 2,103,643 and 2,181,610 that by mounting suitably constructed centrifugal pendulums on a rotating member such as member 9, it is possible to considerably increase in absolute value, relative to a given harmonic, the magnitude of the apparent moment of inertia of said rotatable member. Said patents also disclose that, by suitably constructing the centrifugal pendulums, it is possible to give the rotating member, relatively to a given harmonic, a finite or infinite positive or negative apparent moment of inertia, the value of which is appropriate to each case of application. More particularly, the pendular masses which are mounted on the rotating member move absolutely freely without damping and without being retracted by means of a spring, the sole retracting action being that of the centrifugal forces. The property or functioning of such a device is independent of the speed of rotation of the shaft. Additionally, the aforesaid patents disclose the conditions which must be fulfilled from a constructional standpoint as regards the natural period of the centrifugal pendulums.

The devices comprehended by the present invention comprise a first member coupled to the rotating structure 9 by resilient or damping parts and a system of oscillating masses which are mounted on said first member and not subjected to resilient or damping actions but solely to the retracting action of centrifugal forces acting thereon. It may often be advantageous to employ a system wherein said first member is eccentrically mounted relative to the axis of said shaft whereby said first member will itself be subjected to the retracting action of centrifugal forces as well as to the resilient or damping actions of the coupling means therefor.

In Figs. 1 and 2, said first member, which is directly coupled to the vibrating shaft 6, 9, is a centrifugal mass 16. Said mass is capable of oscillating relative to plate 9 but is subjected to the damping or resilient action of any suitable known means, such as a body of rubber 18, for example. As shown, the substance 18 fills an annular space and is enclosed between the mass 16 and a ring 20 which is secured to the disc 9. The substance 18 is preferably both resilient and damping and may consist of natural or synthetic rubber or a like substance.

Projecting axially from mass 16 are a pair of pins 21, 21 on each of which is formed a roller track 22. The axes K' of pins 21 extend parallel to the axis 5 of shaft 6. Coupled to mass 16 through the medium of pins 21 are a pair of masses 19 which are of the free oscillating and rolling centrifugal mass type. In the illustrated embodiment, each of the masses 19 is formed by a ring of revolution which is capable of oscillating by rolling on the roller track 22 of a pin 21 which is in turn carried by mass 16. It will be understood, of course, that the coupling between masses 16 and 19 may undergo extensive modifications.

In Figs. 3 and 4 the mass 23 is adapted to oscillate freely relative to rotating member 9 by rolling on the wall of a hole or cavity 17 in the composite plate or disc 9. As shown, mass 23 is cylindrical and has a second mass 24 mounted therein. The masses 23 and 24 are coupled together by means of a resilient and damping substance 25 which completely surrounds mass 24 and engages the inner walls of mass 23. The substance 25 may be the same as the substance 18 used in the embodiments of Figs. 1 and 2.

It is known that in damping devices of the first type, of which the system formed by plate 9 and mass 16 which are coupled by resilient means 18 is a diagrammatical example, there is in practice in each case an optimum value for the moment of inertia of the mass 16 relatively to the axis of shaft 6.

Let M be this value.

It has been shown on the other hand that the systems of oscillating centrifugal masses described in the above-mentioned patents are equivalent to a finite or infinite, positive or negative, fictitious inertia, the value of which is $$\frac{\Delta}{\delta}$$

$\Delta$ and $\delta$, being certain determinants of the order $n$ plus 1 and $n$, respectively, relatively to the linear equations which are satisfied by the system within the usual approximations, and $n$ being the number of stages of the pendular system. According to the present invention, the pendular systems of the second type, such as the one which is diagrammatically represented in the example of Fig. 1 by the pendulums 19 or those which correspond to the latter in the other figures, are "tuned" in such a manner that $$\frac{\Delta}{\delta}=M$$

The devices which are the object of the present invention may be placed at any points of the vibrating members and in the case of shafts, the same may be placed at the front, at the rear, or intermediate the ends. In the case of crankshafts, said devices can be placed in the counterweights or outside the shaft. In the case of radial aircraft engines, said devices can be mounted in the counterweights. The pendulums used may be of any type with unifilar, bifilar or multifilar suspension.

The invention has been particularly described for the case of reducing torsional oscillations, but the same principles apply in the case of reducing bending oscillations and in that of the simultaneous reduction of torsional and bending oscillations. In the case of bending oscillations, the movements of the oscillating systems will generally be effected in planes containing the axis of the shaft which produces the centrifugal forces, such as in Fig. 14 of the above-mentioned Patent No. 2,103,643. The shaft which produces the centrifugal forces will frequently be the shaft or machine part in which it is desired to reduce the vibrations, but it could be another shaft which could be kept in rotation in any manner, such as by means of an electric motor or the like.

What is claimed is:

1. In apparatus of the class described, a rotatable member, a damping mass carried by said member for movement relative thereto, yielding means completely surrounding at least a part of said mass and engaging said member, and a freely swinging pendular damping mass carried by first-named mass.

2. In apparatus of the class described, a rotatable machine member having a curved guideway eccentric with respect to the axis of rotation of said member, a damping mass having substantially frictionless rolling engagement with said guideway, a yieldable substance carried by said mass, and a second damping mass embedded in said yieldable substance.

3. In combination, a rotatable member, at least two damping masses carried by said member and having direct interconnection with each other independently of said member, said masses being oscillatable relative to each other and said member and subject to the action of centrifugal forces created during rotation of said member, and resilient means surrounding at least a portion of one of said masses for continuously yieldably resisting at least a portion of the movement of one of said masses relative to said member without resisting movement of the other of said masses relative to said member.

4. In combination, a rotatable member, a plurality of connected damping masses carried by said member, said masses being connected with each other independently of said member and oscillatable relative to each other and said member and subject to the action of centrifugal forces created during the rotation of said member, and resilient means continuously in contact with one of said masses and adapted to resist movement thereof in response to centrifugal forces acting thereon without resisting relative movement between said member and another of said masses.

5. In combination, a rotatable member, a plurality of damping masses carried by said member, said masses being interconnected with each other independently of said member and oscillatable relative to each other and subject to the action of centrifugal forces created relative to the rotation of said member, movement of at least one of said masses relative to said member during rotation of the latter being substantially without friction and along a curved path, and a resilient rubber-like substance completely surrounding at least a portion of another of said masses for continuously yieldably resisting at least a portion of the movement of the latter relative to said member.

6. In combination, a rotatable member, a pair of interconnected damping masses carried by said member and oscillatable relative thereto, said masses being subject to the action of centrifugal forces created during the rotation of said member and adapted for movement relative to each other, one of said masses being connected to the other of said masses independently of said member and having substantially free rolling movement relative to said member, and resilient means for continuously yieldably resisting at least some of the movement of the other of said masses relative to said member in response to centrifugal forces acting thereon.

7. In apparatus of the class described, a rotatable machine member, a damping mass, a yieldable substance such as rubber completely surrounding at least a portion of said mass and supporting the latter on said member, and a freely oscillatable pendular damping mass carried by said first-named mass.

8. In apparatus of the class described, a rotatable member, a damping mass, resilient means interposed between said member and mass for resisting movement of the latter in response to centrifugal forces acting thereon, and a freely swinging pendular damping mass carried by said first-named mass.

9. In apparatus of the class described, a rotatable member having a curved guideway eccentric with respect to the axis of rotation of said member, a damping mass having substantially frictionless rolling engagement with said guideway, a second damping mass carried by said first-named damping mass, and resilient means interposed between said masses for resisting relative movement thereof.

10. In apparatus of the class described, a rotatable machine member having a curved guideway eccentric with respect to the axis of rotation of said member, a hollow damping mass having substantially frictionless rolling engagement with said guideway, a second damping mass within said first-named damping mass, and a yieldable substance for resisting relative movement of said masses.

11. In combination, a rotatable machine member, a damping mass eccentrically mounted on said member for oscillatory movement relative thereto, resilient means for resisting movement of said mass relative to said member in response to centrifugal forces during rotation of said member, and at least one pendular damping mass carried by and oscillatable relative to said first-named damping mass.

12. In combination, a rotatable member, at least two damping masses carried by said member and connected with each other independently of said member, said masses being oscillatable relative to each other and to said member and subject to the action of centrifugal forces created during rotation of said member, and resilient means for continuously yieldably resisting any movement of one of said masses independently of movement of the other of said masses and relative to said member in response to centrifugal forces during rotation of said member.

13. In combination, a rotatable machine member, a centrifugally operable damping mass mounted on said member for oscillatory movement relative thereto, a second damping mass carried by and movable with said first-named damping mass, and resilient means for resisting relative movement of said masses.

14. In apparatus of the class described, a rotatable machine member, pendular damping means including a member oscillatable relative to said member and subject to the action of centrifugal forces created during rotation of said rotatable member, a damping mass carried by one of said members, and a resilient substance surrounding at least a portion of said damping mass for yieldably resisting movement of said mass relative to the member by which it is carried, said second-named member and said mass being connected together independently of said first-named member.

FRANCOIS MARIE MICHEL BERNARD SALOMON.

REFERENCES CITED

The following references are of record in the file of this patent:

UNITED STATES PATENTS

| Number | Name | Date |
|---|---|---|
| 989,958 | Frahm | Apr. 18, 1911 |
| 2,155,052 | Byland | Apr. 18, 1939 |
| 2,181,610 | Salomon | Nov. 28, 1939 |
| 2,383,516 | Salomon | Aug. 28, 1945 |